(12) United States Patent
Close

(10) Patent No.: US 6,396,925 B1
(45) Date of Patent: May 28, 2002

(54) CELLULAR PHONE HOLDING DEVICE

(76) Inventor: Peter V. Close, 195 Shongum Rd., Denville, NJ (US) 07834

( * ) Notice: Subject to any disclaimer, the term of this patent is extended or adjusted under 35 U.S.C. 154(b) by 0 days.

(21) Appl. No.: 09/200,319

(22) Filed: Nov. 25, 1998

(51) Int. Cl.⁷ .............................................. H04M 1/00
(52) U.S. Cl. ...................................... 379/446; 379/455
(58) Field of Search ................................ 379/446, 455, 379/454; 29/450

(56) References Cited

U.S. PATENT DOCUMENTS

| | | | |
|---|---|---|---|
| 5,052,649 A | 10/1991 | Hunnicutt | 248/311.2 |
| D327,070 S | 6/1992 | Watanbe | D14/251 |
| 5,426,509 A | 6/1995 | LaPorte et al. | 248/311.2 |
| 5,588,055 A | * 12/1996 | Williamson et al. | 379/446 |
| 5,605,312 A | 2/1997 | Elder et al. | 248/230.7 |
| 5,610,979 A | * 3/1997 | Yu | 379/446 |
| 5,651,523 A | 7/1997 | Bridges | 248/311.2 |
| 5,697,139 A | * 12/1997 | Gaetke | 29/450 |
| 5,745,565 A | 4/1998 | Wakefield | 379/446 |

* cited by examiner

*Primary Examiner*—Jack Chiang
(74) *Attorney, Agent, or Firm*—Ernest D. Buff; Ernest D. Buff & Associates

(57) ABSTRACT

The present invention relates to cellular phone holding devices, and more particularly, to a cellular phone holding device having a cylindrical body, with an outer diameter at least as large as the inner diameter of a vehicle beverage holder, a cavity defined therein to frictionally hold such devices and a weighted bottom portion. The present invention may further include a means for providing power to the cellular phone or for charging a removable cellular phone battery pack. The present invention minimizes the need for vehicle drivers to tend to unsupported articles in their vehicles, which may distract attention from their vehicular operation. In light of this, the present invention is ideally suited for use in domestic, business and recreational vehicle travel, including use in automobiles, vans, trucks, golf-carts, boats, etc.).

10 Claims, 4 Drawing Sheets

CELLULAR PHONE HOLDING DEVICE

BACKGROUND OF THE INVENTION

1. Field of the Invention

The present invention relates to cellular phone holding devices, and more particularly, to a cellular phone holding device that frictionally fits within a beverage holder of a vehicle to hold the cellular phone while it is not in use. The present invention is ideally suited for use in automobiles, vans, trucks, golf-carts, boats, etc. and virtually eliminates the need for vehicle drivers to tend to unsupported articles such as, for example, cellular phones, beepers and the like during operation of the vehicle.

2. Description of the Prior Art

As a highly mobile society, we are constantly looking for new ways to carry out our everyday activities while traveling. Consider, for example, drive-through food, portable computers, cellular telephones, beepers and the like. However, the hazards of engaging in such distracting activities while operating a vehicle, be it a car, truck, boat, or whatever, are obvious. Consequently, various holders and holding devices have been invented that permit relatively undistracted operation of the vehicle.

U.S. Pat. No. 5,745,565 to Wakefield describes a combination beverage and cellular phone holder that fits into a vehicle beverage holder. The device disclosed is intended primarily as a beverage holder and includes an insert that will hold a cellular phone. The insert includes a top having a generally rectangular opening defined therethrough which includes a resilient part for holding a cellular phone in the insert. Without the insert, the Wakefield device could not hold a cellular phone or other electronics device securely within the vehicle beverage holder.

Beverage holders having a wider top section and a narrow bottom section are generally known in the art. For example U.S. Pat. No. 5,651,523 to Bridges discloses two such beverage holders. In addition, U.S. Pat. No. 5,052,649 to Hunnicutt discloses a beverage holder adaptor having a tapered lower portion to facilitate its use in variously dimensioned vehicle beverage receptacles. However, neither Bridges nor Hunnicutt discloses a cellular phone holding device that fits securely into a vehicle beverage holder.

In light of the foregoing, there exists the need for a cellular phone holder that overcomes these shortcomings of the prior art.

SUMMARY OF THE INVENTION

The present invention provides a device for holding a cellular telephone in a vehicle beverage holder that virtually eliminates the need to attend to the cellular telephone while it is not in use. Consequently, the cellular phone is held securely in place when not in use and the vehicle operator is free from the distraction of having to locate, secure, or otherwise keep track of the cellular phone while operating the vehicle.

In a first embodiment of the present invention, a device for holding a cellular telephone in a vehicle beverage holder comprises a partially pliable cylindrical body having a weighted bottom and an outer wall extending substantially perpendicularly upward therefrom and defining a substantially uniform outer diameter of the device. The cylindrical body has a cavity defined therein that tapers generally inward and that extends substantially downward from a top surface of the cylindrical body. The tapered cavity preferably frictionally holds the cellular telephone in the device. The outer diameter of the device is larger than the inner diameter of the vehicle beverage holder so that the outer wall of the cylindrical body frictionally engages the inner wall of the vehicle beverage holder to hold the device when it is placed in the vehicle beverage holder.

In a second embodiment of the present invention, a device for holding a cellular telephone in a vehicle beverage holder comprises a partially pliable cylindrical body having a top section having an outer wall that defines an outer diameter and a bottom section having an outer wall that defines an outer diameter that is less than the top section outer diameter. The cylindrical body has a cavity defined therein that tapers generally inward and that extends substantially downward from a top surface of the cylindrical body. The tapered cavity preferably frictionally holds the cellular telephone in the device. The bottom section outer diameter is preferably larger than the inner diameter of the vehicle beverage holder so that the outer wall of the bottom section of the cylindrical body frictionally engages the inner wall of the vehicle beverage holder to hold the device when the device is placed in the vehicle beverage holder.

Each of the previously defined embodiments may include a means for providing power to the cellular phone. Alternatively, the present invention may include a means for charging a cellular phone battery pack. The cellular phone may be associated with an internal speaker of the vehicle to provide for hands-free application. A voice-recognition feature with which the cellular phone may be equipped can also facilitate the hands-free application.

In each of the previously defined embodiments, the cylindrical body is made from an open-celled foam that permits the outer wall of the body to deflect. Consequently, when the device of the present invention is placed in a vehicle beverage holder, the outer wall of the cylindrical body frictionally engages the inner wall of the vehicle beverage holder to secure the device in place, even while the vehicle is in motion. A cellular phone or other electronics device may then be held by the inventive device.

BRIEF DESCRIPTION OF THE DRAWINGS

The invention will be more fully understood and further advantages will become apparent when reference is made to the following detailed description of the preferred embodiments of the invention and the accompanying drawings in which like reference characters denote similar elements throughout the several views and wherein.

DETAILED DESCRIPTION OF THE PREFERRED EMBODIMENTS

The present invention provides a device for holding a cellular telephone in a vehicle beverage holder that virtually eliminates the need to attend to the cellular telephone while it is not in use. Consequently, the cellular phone is held securely in place when not in use and the vehicle operator is free from the distraction of having to locate, secure, or otherwise keep track of the cellular phone while operating the vehicle.

Figure 1:
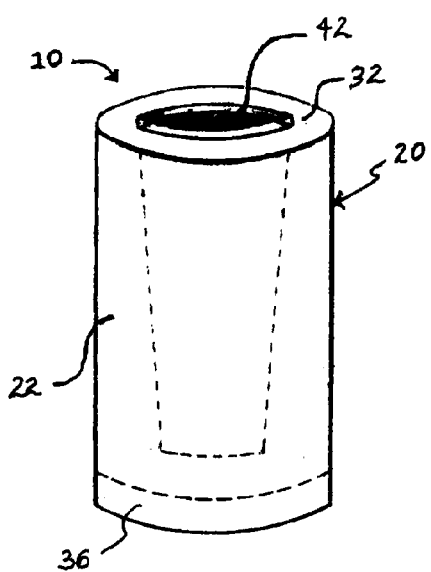
FIG. 1 is a perspective view of a first embodiment of a cellular phone holding device constructed in accordance with the present invention.
Figure 2:
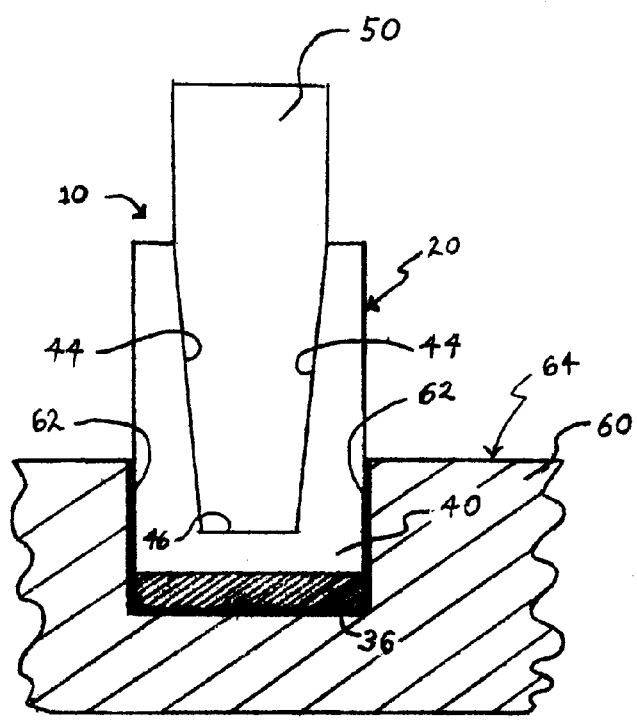
FIG. 2 is a cross-sectional view of the holding device of FIG. 1.

Referring to drawings in detail, FIGS. 1 and 2 depict a cellular phone holding device 10 constructed in accordance with a first embodiment of the present invention. The holding device 10 includes a generally cylindrical body 20 having an outer wall 22 that defines a substantially constant and uniform outer diameter for the holding device 10. The outer diameter of the device 10 is larger than the inner diameter of the vehicle beverage holder 60 into which the inventive holding device 10 is removably placed. The cylindrical body 20 is at least partially pliable which permits the temporary deformation of the cylindrical body 20 as the holding device 10 is placed in the vehicle beverage holder 60. The pliable nature of the cylindrical body 20 also provides a frictional fit between the outer wall 22 of the cylindrical body 20 and an inner wall 62 of the vehicle beverage holder 60. A weighted bottom 36 provided in the cylindrical body 20 stabilizes the inventive holding device 10 and supplements the securement provided by the frictional fit between the outer wall 22 of the cylindrical body 20 and the inner wall 62 of the vehicle beverage holder 60.

A cavity 42 is defined in the cylindrical body 20 that extends generally downward from a top surface 32 thereof. The cavity 42 includes side walls 44 that taper or converge toward each other moving away from the top surface 32 and that are joined by the bottom 46 of the cavity 42. The cavity 42 is sized and shaped to accept a cellular telephone 50 or other electronics device and to hold the telephone 50 securely in place within the inventive holding device 10. Although the cavity 42 is depicted and disclosed as being tapered, a non-tapered cavity 42 is also contemplated by the present invention provided that the cavity 42 is sized and shaped to hold a cellular telephone 50 in place.

For the embodiment depicted in FIGS. 1 and 2, the outer diameter of the cylindrical body 20 is preferably between approximately 2.0 and 3.0 inches. While the height of the inventive holding device 10 is preferably between approximately 2 inches and 5 inches, shorter or taller devices 10 are also contemplated by the present invention.

Figure 3:
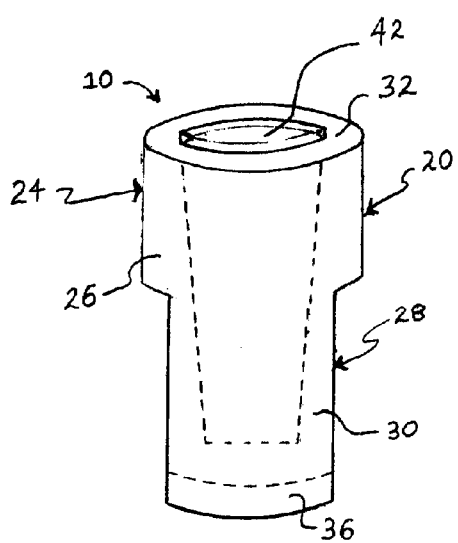
FIG. 3 is a perspective view of a second embodiment of a cellular phone holding device constructed in accordance with the present invention.
Figure 4:
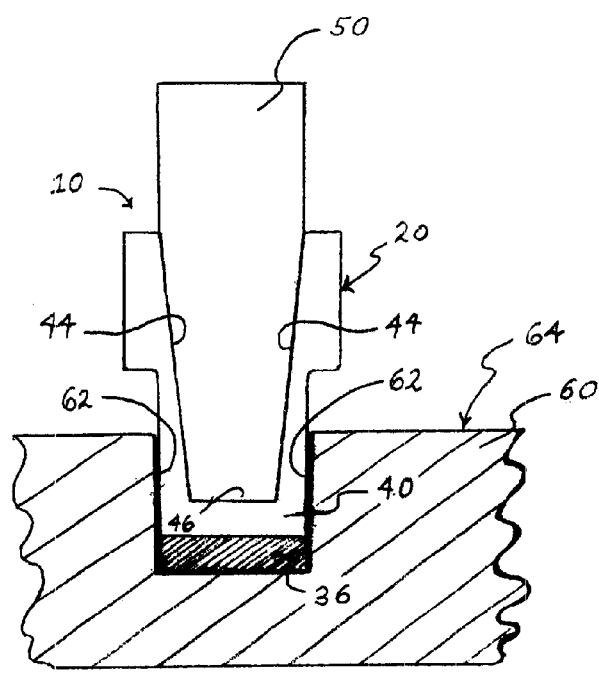
FIG. 4 is a cross-sectional view of the holding device of FIG. 3.

Referring to drawings in detail, FIGS. 3 and 4 depict a cellular phone holding device 10 constructed in accordance with a second embodiment of the present invention. The holding device 10 includes a cylindrical body 20 having a top section 24 having an outer wall 26 that defines an outer diameter and a bottom section 28 having an outer wall 30 that defines an outer diameter that is less than the outer diameter of the top section 24. The outer diameter of the bottom section 28 is greater than the inner diameter of the vehicle beverage holder 60 into which the holding device 10 is removably placed. The cylindrical body 20 is at least partially pliable which permits the temporary deformation of the outer wall 30 of the bottom section 28 as the holding device 10 is placed in the vehicle beverage holder 60. The pliable nature of the cylindrical body 20 also provides a frictional fit between the outer wall 30 and an inner wall 62 of the vehicle beverage holder 60. A weighted bottom 36 provided in the cylindrical body 20 stabilizes the holding device 10 and supplements the securement provided by the frictional fit between the outer wall 30 and the inner wall 62 of the vehicle beverage holder 60. As shown in FIG. 4, a gap may be present between the top section 24 of the cylindrical body 20 and a top surface 64 of the vehicle beverage holder 60 after the holding device 10 is removably placed there. It will be obvious to persons skilled in the art that a gap is not a required feature of the present invention and that the top section 24 may rest flush with the top surface 64 of the vehicle beverage holder 60.

A cavity 42 is defined in the cylindrical body 20 that extends generally downward from a top surface 32 thereof. The cavity 42 includes side walls 44 that taper or converge toward each other moving away from the top surface 32 and that are joined by the bottom 46 of the cavity 42. The cavity 42 is sized and shaped to accept a cellular telephone 50 or other electronics device and to hold the telephone 50 securely in place within the holding device 10. Although the cavity 42 is depicted and disclosed as being tapered, a non-tapered cavity 42 is also contemplated by the present invention provided that the cavity 42 is sized and shaped to hold a cellular telephone 50 in place.

For the embodiment depicted in FIGS. 3 and 4, the outer diameter of the bottom section 28 is preferably between approximately 2 and 3 inches. While the height of the bottom section 28 is preferably between approximately 2 inches and six inches, shorter or taller bottom sections are also contemplated by the present invention. The outer diameter of the top section 24 of the cylindrical body 20 is preferably between approximately 3 and 5 inches, is also generally cylindrical, but wider than the bottom section 28. While the height of the top section 24 of the inventive holding device 10 is preferably between approximately 1 inches and 2 inches, shorter or taller top sections of devices 10 are also contemplated by the present invention.

Figure 5:
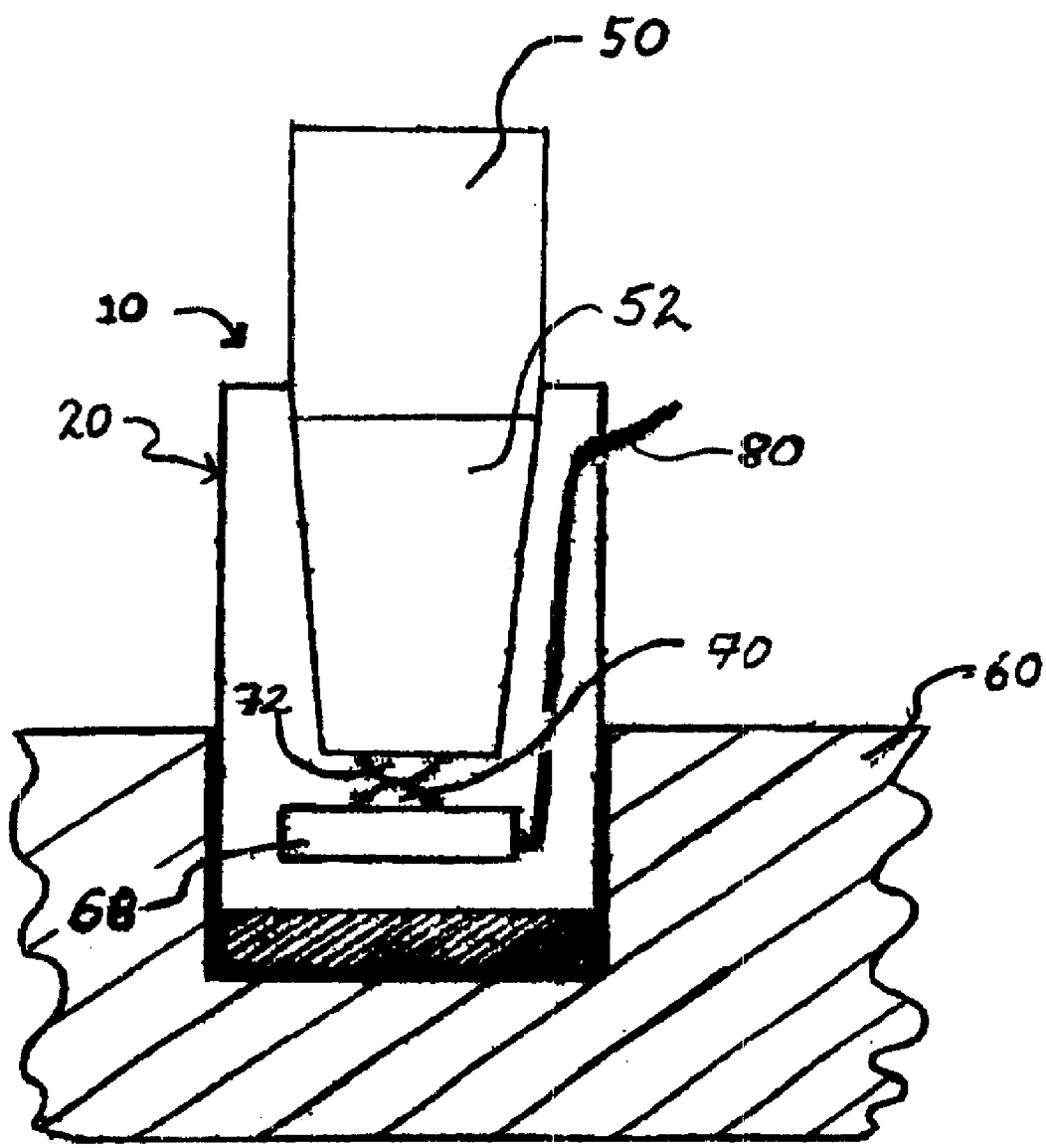
FIG. 5 is a cross-sectional view of a holding device having a means for providing power to the phone.

The present invention may also include means to provide power to the cellular phone 50 while it is held within the holding device 10 as depicted in FIG. 5. The present invention may include a means for charging 68 a cellular phone battery pack 52, while phone 50 is held within the holding device 10. In both embodiments (i.e. in both FIGS. 5 and 6), complementarily sized and shaped electrical contacts 70 are provided in the holding device 10 and are preferably biased into contacting engagement with contacts 72 provided on the phone 50 when it is placed in the holding device 10. For the charging means 68 depicted in FIG. 6, power conditioning circuitry 74 is provided to monitor the charging of the phone battery 52 and prevent damage thereto.

Figure 6:
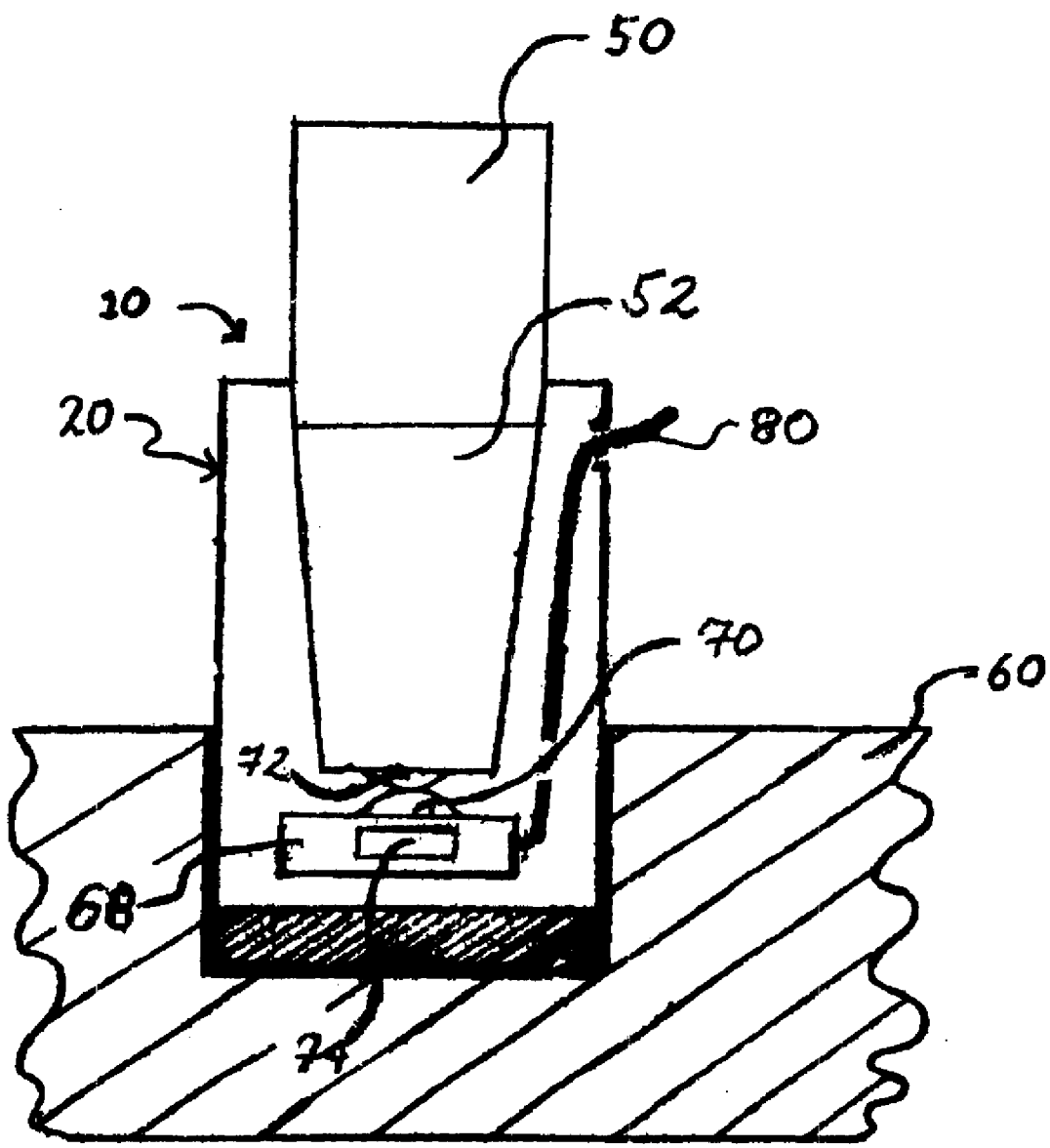
FIG. 6 is a cross-sectional view of a holding device having a means for charging the phone battery.

Moreover, when the holding device 10, as shown in FIG. 5 or 6, is placed in the vehicle beverage holder 60, either of the described means 68 are preferably located near the weighted bottom 36 of the cylindrical body 20.

It will be obvious to persons skilled in the art that the above-described power and charging means may also be provided in the holding device 10 depicted in FIGS. 3 and 4. Although phone contacts are shown on the bottom of FIGS. 5 and 6 that location is merely illustrative as it would be apparent to one-skilled in the art that such contacts can be located anywhere along the cellular phone that sits within the holding device.

For any of the above-identified embodiments, the holding device 10 of the present invention is preferably constructed of a generally pliable material 40 such as, for example, an open-celled foam. In a preferred embodiment, the pliable material 40 has a cell density of between approximately 50 cells per inch and 500 cells per inch. The holding device 10 is preferably substantially encased in a resilient material, such as vulcanized rubber, plastic or the like. In upscale embodiments, wherein it is desirable for the device 10 to match interiors of luxury vehicles, the device 10 may be encased or coated with a variety of materials, such as tulip wood, chrome, brass, and the like.

Advantageously, the generally cylindrical body 20 of the present invention fits directly into an existing vehicle beverage holder 60, eliminating the need for an additional cup holder to be inserted into the existing beverage holder of a vehicle. The outer diameter of the present invention also is dimensioned to ensure a secure fit between the inventive holding device 10 and a vehicle's beverage holder 60. In particular, the outer diameter of the holding device 10 of the present invention is at least as large as the inner diameter of the vehicle beverage holder 60.

Having thus described the invention in rather full detail, it will be recognized that such detail need not be strictly adhered to but that various changes and modifications may suggest themselves to one skilled in the art, all falling within the scope of the invention, as defined by the subjoined claims.

What is claimed is:

1. A device for holding a cellular telephone in a vehicle beverage holder fixedly mounted to the vehicle and having an inner wall provided with a surface area that defines an inner diameter of the vehicle beverage holder, said device comprising:
   (a) a partially pliable cylindrical body having a weighted bottom and an outer wall extending substantially perpendicularly upward therefrom and defining a substantially uniform outer diameter of said device, said cylindrical body having a cavity defined therein that tapers generally inward and that extends substantially downward from a top surface of said cylindrical body, said tapered cavity frictionally holding the cellular telephone in said device;
   (b) said outer diameter of said device being larger than the inner diameter of the vehicle beverage holder so that said outer wall of said cylindrical body becomes temporarily deformed and frictionally engages substantially the entire surface area of the inner wall of the vehicle beverage holder to hold said device securely in place when said device is placed in the vehicle beverage holder.

2. A device as recited by claim 1, wherein said cylindrical body is constructed from an open-celled foam material.

3. A device as recited by claim 1, wherein said outer diameter of said device is between approximately 3 inches and 5 inches.

4. A device as recited by claim 1, further comprising a means for providing power to the cellular phone from an external power supply.

5. A device as recited by claim 1, further comprising a means for charging a cellular phone battery pack from an external power supply.

6. A device for holding a cellular telephone in a vehicle beverage holder fixedly mounted to a vehicle and having an inner wall provided with a surface area that defines an inner diameter of the vehicle beverage holder, said device comprising:
   (a) a partially pliable cylindrical body having a top section having an outer wall that defines an outer diameter and a bottom section having an outer wall that defines an outer diameter that is less than said top section outer diameter, said cylindrical body having a cavity defined therein that tapers generally inward and that extends substantially downward from a top surface of said cylindrical body, said tapered cavity frictionally holding the cellular telephone in said device;
   (b) said bottom section outer diameter being larger than the inner diameter of the vehicle beverage holder so that said outer wall of said bottom section of said partially pliable cylindrical body becomes temporarily deformed and frictionally engages substantially the entire surface area of the inner wall of the vehicle beverage holder to hold said device when said device is placed in the vehicle beverage holder.

7. A device as recited by claim 6, wherein said cylindrical body is constructed from an open-celled foam material.

8. A device as recited by claim 6, wherein said outer diameter of said bottom section of said cylindrical body is between approximately 2 inches and 3.5 inches.

9. A device as recited by claim 6, further comprising a means for providing power to the cellular phone from an external power supply.

10. A device as recited by claim 6, further comprising a means for charging a cellular phone battery pack from an external power supply.

* * * * *